(No Model.)
L. HARRIS.
VEHICLE HUB ATTACHING DEVICE.
No. 493,771. Patented Mar. 21, 1893.
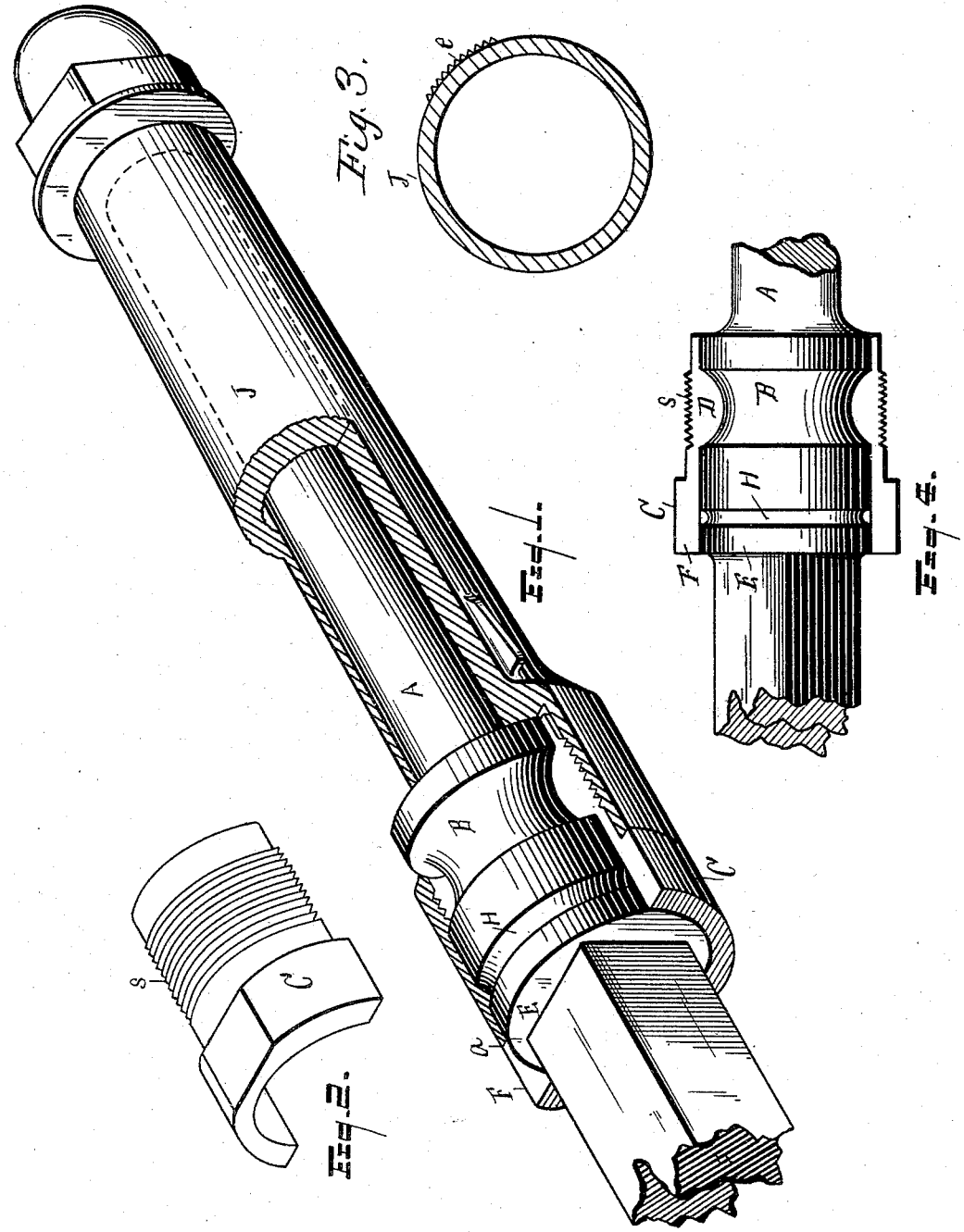
WITNESSES
S. C. Thomas
James M. Billig
INVENTOR
Levi Harris
Per-Lucius C. West
Atty

UNITED STATES PATENT OFFICE.

LEVI HARRIS, OF KALAMAZOO, MICHIGAN, ASSIGNOR OF THREE-FOURTHS TO OSCAR M. ALLEN, SR., AND HORACE B. PECK, OF SAME PLACE.

VEHICLE-HUB-ATTACHING DEVICE.

SPECIFICATION forming part of Letters Patent No. 493,771, dated March 21, 1893.

Application filed November 18, 1892. Serial No. 452,417. (No model.)

*To all whom it may concern:*

Be it known that I, LEVI HARRIS, a citizen of the United States, residing at Kalamazoo, county of Kalamazoo, State of Michigan, have invented a new and useful Vehicle-Wheel Box and Axle, of which the following is a specification.

This invention more especially relates to wheel box and axle patented to me May 31, 1892, in which was employed a two-part nut at the inner end of the wheel-hub, to hold the wheel on the axle, and in which appeared certain peculiarities of construction hereinafter explained.

The present invention has for its object a change in the construction of the two-part nut and the axle, in connection with the features in the patent above referred to, with a design to more effectually prevent the ingress of sand into the wheel box, and also to add to the strength of the two-part nut and facilitate the operation of attaching the wheel to the axle.

In the drawings forming a part of this specification, Figure 1 is a perspective view, with parts broken away, showing the construction of the axle, the wheel-box, and the two-part nut. Fig. 2 is a perspective view of one part of the two-part nut. Fig. 3 is an end elevation of the inner end of the wheel-box, showing a change in the construction from Fig. 1; and Fig. 4 is a broken view, showing some of the lettered details from Fig. 1 in plan view, as they would appear when one part of the two-part nut was removed.

Referring to the lettered parts of the drawings, A is the axle, which axle near its inner end is provided with a circumferential groove, B, as illustrated in the prior patent above referred to. One half of the two-part nut referred to is illustrated at C, in Figs. 1, 2 and 4. This nut is provided with a circular rib, D, on its internal periphery, fitting into the circumferential groove B, of the axle, to prevent end shucking of the wheel without the use of packing, as described in the prior patent referred to. In the prior patent referred to, the inner end enlargement, E, of the axle, and the inner end, F, of the two-part nut, did not terminate at the same point, so as to register with each other, as they do in the present application; and the axle A, in the prior patent referred to, was not provided with a small circumferential groove, H, between the terminal end of the enlarged portion of the axle and the groove B, as shown in Figs. 1 and 4 in the present application. The object of having the inner end, E, of the enlarged circular portion of the axle, A, and the inner end, F, of the two-part nut, C, register with each other, is to prevent the ingress of sand, as, since they fit closely to each other, with nicely dressed surfaces, it would be almost utterly impossible for any sand or dust to work in, which it would do if the two-part nut extended farther in than the terminal end of the enlarged portion of the axle, or if the inner end of the two-part nut fell short of said inner terminal end of the enlarged portion of the axle; since in such case the sand would collect and work in and grind away the bearings.

The groove H in the axle (which groove *per se* is not new, being found in all modern axles, but still forms an element of novelty in the present combination) receives whatever sand or dust might possibly work in, also accumulations from the frictional wear of the parts in contact, the design being that the collections in said groove will not overflow and get into the more important bearings of the construction before the wheel will be removed for cleaning and lubricating.

Referring to Fig. 3, which shows the inner terminal end, *a*, of the box, J, in Fig. 1, it will be observed that the peripheral surface of the box is provided with a series of corrugations or raised ribs, *e*, only a few being shown in Fig. 3, but the idea being that the whole peripheral surface of this portion of the box shall be provided with said ribs or corrugations, which may consist of a few, separated quite a distance from each other or they may be in close contact with each other, as shown in said Fig. 3. The object of these corrugations or raised ribs is to assist in holding the box in the wooden portion of the wheel-hub (said wooden hub not being here shown) which hub would terminate at the inner end, *a*, in Fig. 1, said corrugations or ribs, *e*, impressing themselves into the internal peripheral surface of the hub.

Referring to Figs. 1 and 4, it will be observed that the circumferential threads, S, on the two-part nut, C, only extend a distance equal to the width of the internal rib, D, of the said two-part nut. The object of this construction is to facilitate the attachment of the wheel to the axle, since, having a less number of threads than appeared in the prior patent referred to, the nut can be attached quicker, and also the two-part nut is stronger, since it is threaded at the thickest portion of said two-part nut.

Having thus described my invention, what I claim as new, and desire to secure by Letters Patent of the United States, is—

1. The combination of a wheel having a box internally threaded at its inner end, an axle having a circular enlarged portion at the inner end of the wheel-hub, said portion being provided with a circumferential groove near said end, and a small circumferential groove parallel with the first named groove and nearer to the terminal end, and a two-part nut provided with an internal rib fitting into said first named circumferential groove of the axle, said two-part nut being adapted to screw into the threaded end of the box of said wheel, the inner end of said two-part nut terminating at the same point at which the inner end of the enlarged portion of said axle terminates; substantially as set forth.

2. The combination of a wheel having a box internally threaded at its inner end, an axle having a circumferential groove at said end of the box, and a two-part nut adapted to screw into the threaded end of said box of the wheel and provided with the internal rib fitting into the circumferential groove of said axle, said two-part nut being provided with an exterior threaded portion, of a width corresponding to the width of the internal rib, the sides of said rib and groove, when viewed in cross section, being curved or slanting; substantially as set forth.

In testimony to the foregoing I have hereunto subscribed my name in the presence of two witnesses.

LEVI HARRIS.

Witnesses:
RUFUS SCOTT,
JOHN BECK.